(No Model.)
M. FLAMMANG.
PHOTOGRAPHIC CAMERA.
No. 328,664. Patented Oct. 20, 1885.
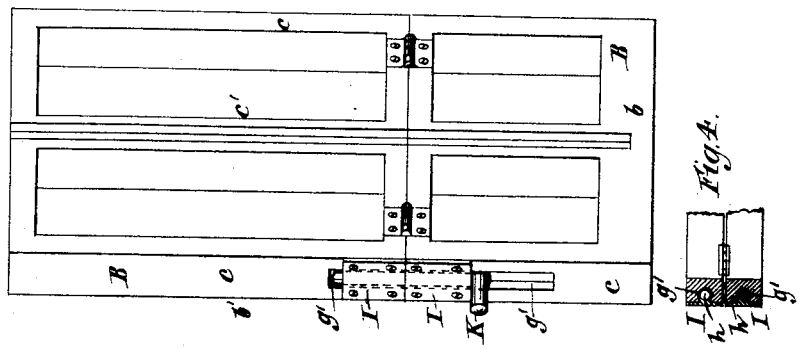
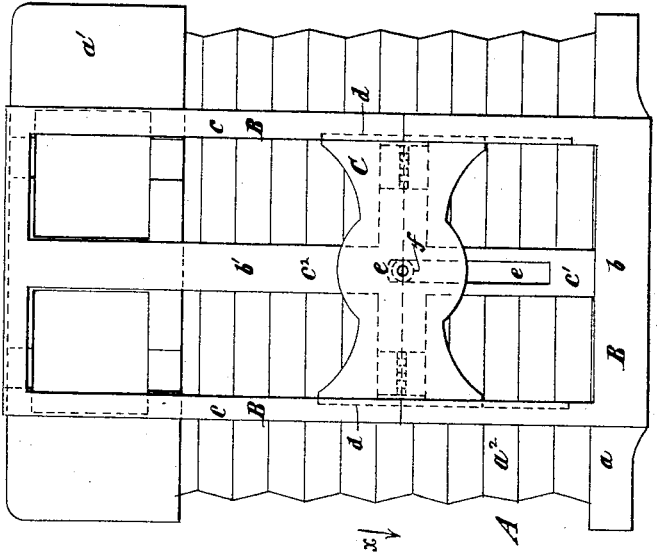
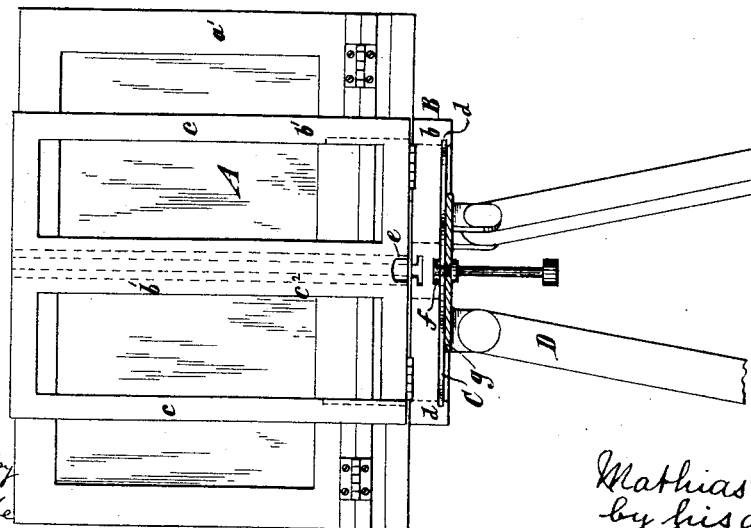

UNITED STATES PATENT OFFICE.

MATHIAS FLAMMANG, OF NEWARK, NEW JERSEY.

PHOTOGRAPHIC CAMERA.

SPECIFICATION forming part of Letters Patent No. 328,664, dated October 20, 1885.

Application filed February 24, 1885. Serial No. 156,610. (No model.)

*To all whom it may concern:*

Be it known that I, MATHIAS FLAMMANG, of Newark, in the county of Essex and State of New Jersey, have invented a certain new and useful Improvement in Photographic Apparatus, of which the following is a specification.

My improvement relates to photographic cameras and means for supporting and adjusting the same.

I will describe a photographic apparatus embodying my improvement, and then point out the novel features in claims.

In the accompanying drawings, Figure 1 is a rear elevation of a photographic camera embodying my improvement. Figure 2 is an inverted or bottom view of the same, partly in section, and showing some of the parts in a different position from that in Fig. 1. Fig. 3 is a view of a modification thereof, the parts being detached from the camera, and Fig. 4 is a transverse section thereof.

Referring first to Figs. 1 and 2, A designates the camera. It is made with a front portion, $a$, and a rear portion, $a'$. Between the portions $a$ and $a'$ extends a portion, $a^2$, of bellows-like construction, which provides for the adjustment of the rear portion, $a'$, into different positions relatively to the portion $a$. All these various parts may be of the usual or any suitable construction.

The camera is supported upon a frame, B, arranged beneath the same. This frame B has secured to it near one end the front portion, $a$, of the camera by screws or in any other suitable manner. It is composed of a section, $b$, and a section, $b'$. The section $b$ remains normally in position beneath the camera, but the section $b'$ may be folded up against the rear portion, $a'$, of the camera, as shown more clearly in Fig. 1. The sections $b$ $b'$ of the frame are hinged together, as at $b^3$, to admit of this movement on the part of the section $b'$. The section $b'$ is thus folded up for the purpose of rendering the camera compact for transportation. As shown, the frame B is provided with side rails, $c$, and center rails or reaches, $c'$ $c^2$. I have shown grooves or slideways $d$ in the side rails, $c$, upon the inner surfaces thereof. I have shown another groove, $e$, upon the under side of the center rails or reaches, $c'$ $c^2$. Each of these grooves extends in the direction of the length of the frame.

C is a securing-piece. As here shown, it consists of a flat piece of metal. It need not necessarily be flat, however. Its side edges are arranged within the grooves or slideways $d$. A projection, $f$, near the center thereof (shown in dotted lines in Fig. 2) enters the groove $e$. Extending centrally through the projection $f$ is an aperture, here shown as screw-threaded. This aperture is adapted to receive a screw upon a plate, $g$, forming a portion of a tripod or stand, D, upon which the camera and its appurtenances are supported. By this means the tripod and camera are secured together. The object of the securing-piece C is to lock the sections $b$ $b'$ of the frame B in approximately the same horizontal plane in order to furnish a firm support for the camera when distended. This is accomplished by moving the camera and frame in the direction indicated by the arrow $x$. The securing-piece is thus brought into the grooves or slideways $d$ in both the sections $b$ $b'$ of the frame B. The said two sections are thereby held secured together, and the section $b'$ cannot be swung upward against the rear of the camera so long as the securing-piece C remains within the grooves $d$ in the section $b'$. The end walls of the grooves $d$ and $e$ that are toward the rear of the camera constitute stops for limiting the distance which the frame B shall be moved upon the securing-piece. The securing-piece is unsecured to the rear portion of the camera.

Another advantage resulting from this form of securing device is that when in the position indicated in Fig. 2 the camera is quite centrally disposed upon the tripod, and is therefore more evenly balanced when the bellows is distended than it would otherwise be. In order to move the camera in the direction indicated by the arrow the breast of the operator may be placed against the rear end of the section $b'$, when by pushing slightly the camera will be moved along.

The securing-piece of modified form (shown in Figs. 3 and 4) is a bolt arranged within grooves or slideways $d$ upon the outer side of one of the side rails, $c$. It may be moved to and fro by hand to secure and release the sections $b\ b'$ of the frame B. It is adapted to be moved back and forth within tubes or bushings $h$, rigidly secured to plates I. The tubes or bushings $h$ fit snugly within the grooves, $g'$, and the plates I are secured to the side rail, $c$, by screws or otherwise.

It will be seen that by my improvement the camera and frame of the securing-piece may be moved, so as to insure the locking of the fixed section and swinging section of the frame together without affecting the position of the camera relative to the frame.

What I claim as my invention, and desire to secure by Letters Patent, is—

1. The combination, with a camera and a frame arranged beneath the same, having a fixed section and a swinging section, of a securing-piece unconnected with the rear portion of the camera, and grooves or slideways in the frame in which said securing-piece may slide, substantially as described, whereby by a relative rectilinear movement between the securing-piece and the frame the swinging section may be locked in line with the fixed section or unlocked therefrom without affecting the position of the camera relatively to the frame.

2. The combination, with a camera, of a frame arranged beneath the camera, having a fixed section and a swinging section, a securing-piece for locking the swinging section and fixed section together, and a tripod fastened to the securing-piece.

3. The combination, with a camera, of a frame arranged beneath the camera, having a fixed section and a swinging section, a securing-piece unconnected to the rear portion of the camera, fitted into the frame and capable of a rectilinear movement for locking the swinging section and fixed section together, and a stop or stops for limiting the movement of the camera and frame upon the sliding piece or the sliding piece upon the frame, substantially as specified.

4. The combination, with a camera, of the frame B, having the sections $b\ b'$, provided with the grooves $d$, the tripod D, and the securing-piece C, secured to the tripod, substantially as specified.

M. FLAMMANG.

Witnesses:
T. J. KEANE,
WM. G. LIPSEY.